United States Patent [19]

Feldmann et al.

[11] Patent Number: 4,940,378
[45] Date of Patent: Jul. 10, 1990

[54] POSITIONING DEVICE FOR POSITIONING A LOAD CARRYING PLATFORM RELATIVE TO A DOCKING STATION

[75] Inventors: Hans-Ueli Feldmann, Safnern; Ueli Heiz, Bern, both of Switzerland

[73] Assignee: JD-Technologie AG, Zug, Switzerland

[21] Appl. No.: 413,993

[22] Filed: Sep. 28, 1989

[30] Foreign Application Priority Data

Sep. 29, 1988 [CH] Switzerland ............... 3618/88

[51] Int. Cl.$^5$ .............................................. B65G 67/00
[52] U.S. Cl. .................................... 414/401; 414/396; 414/584
[58] Field of Search ............... 414/389, 396, 401, 402, 414/587, 585, 280, 661, 467, 491, 492, 495, 501

[56] References Cited

U.S. PATENT DOCUMENTS

| | | |
|---|---|---|
| 3,666,118 | 5/1972 | Raynes et al. ............... 414/401 |
| 4,773,811 | 9/1988 | Wasner ............... 414/396 X |
| 4,818,171 | 4/1989 | Burkholder ............... 414/401 X |

FOREIGN PATENT DOCUMENTS 2078663  1/1982  United Kingdom ............... 414/401

Primary Examiner—Frank E. Werner
Assistant Examiner—Keith L. Dixon
Attorney, Agent, or Firm—Fish & Richardson

[57] ABSTRACT

For accurate positioning of a conveyor vehicle relative to a fixed docking station, the conveyor vehicle comprises a load carrying platform, which is displaceably supported on a base portion of the vehicle. The load carrying platform can be extended towards said docking station and is provided with positioning members at its front side. By these positioning members the platform is lifted at its front side onto the level of the docking station and is positioned relative thereto. The platform furthermore is provided with a leveling device, so that the rear side of the platform is lifted substantially simultaneously together with the front side while it is extended towards the docking station.

10 Claims, 6 Drawing Sheets

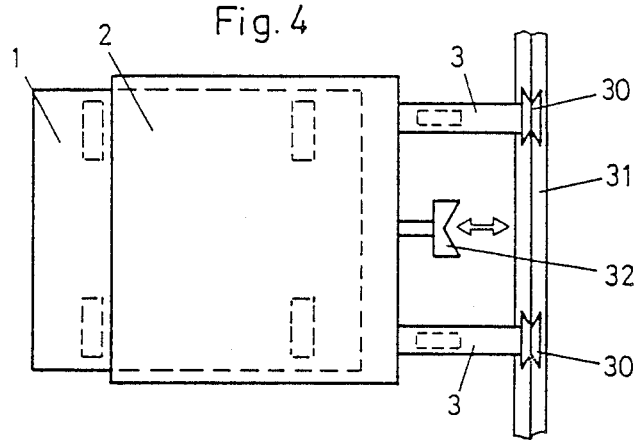
Fig. 4
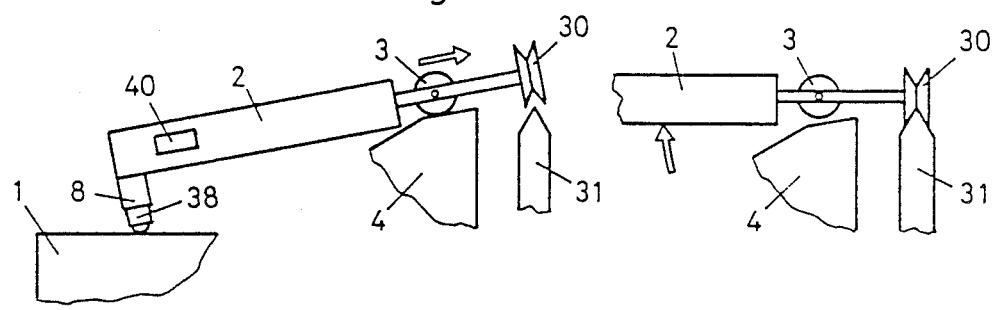
Fig. 5
Fig. 8
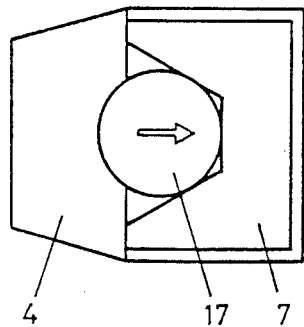
Fig. 9
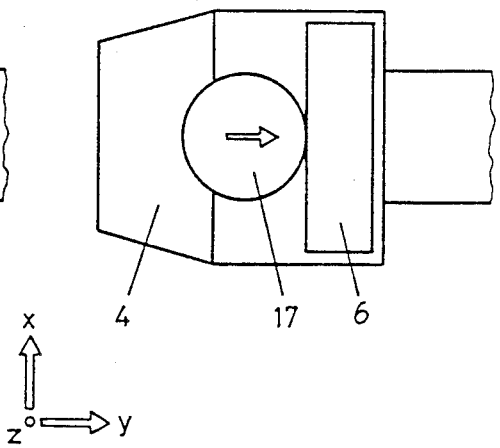

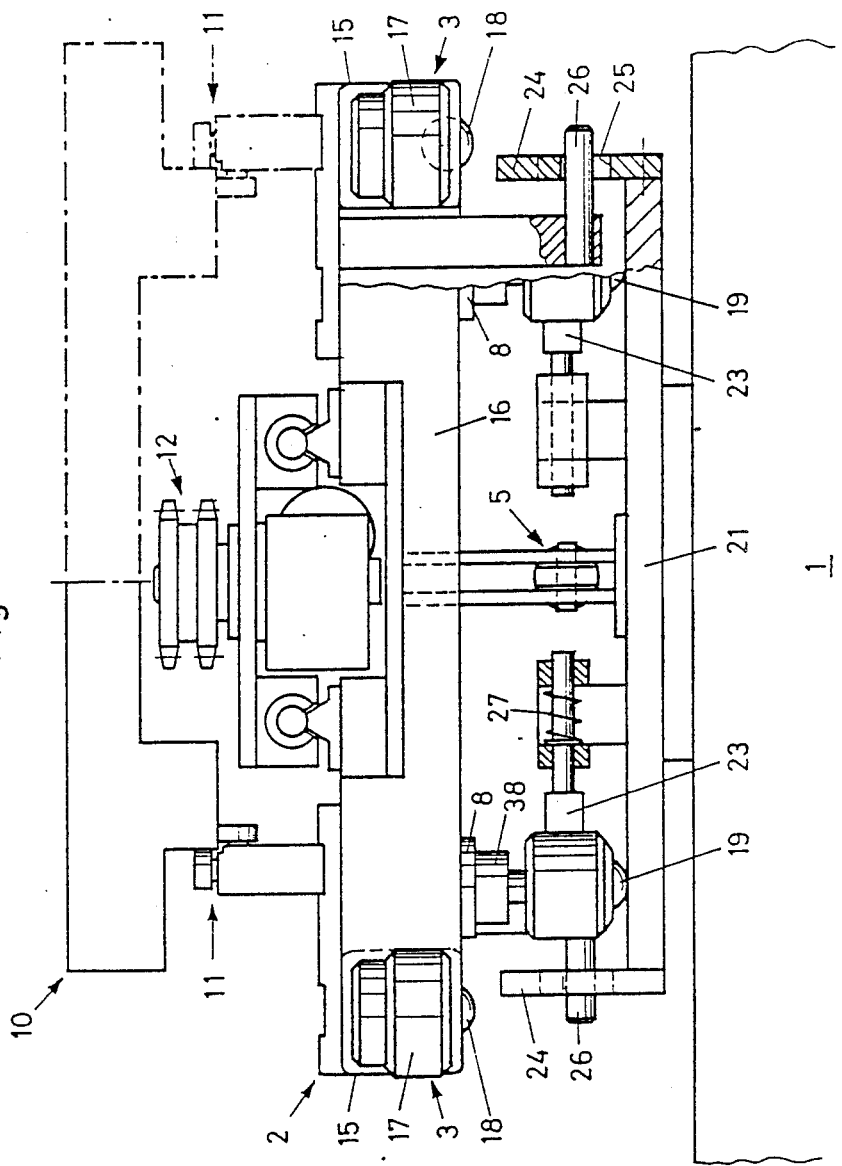

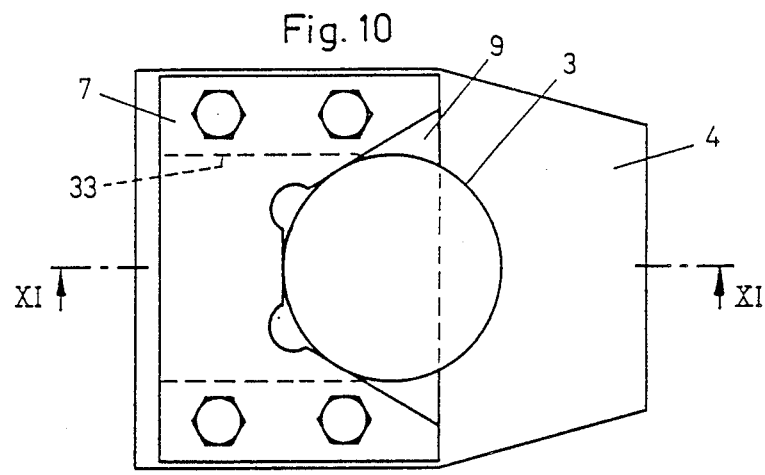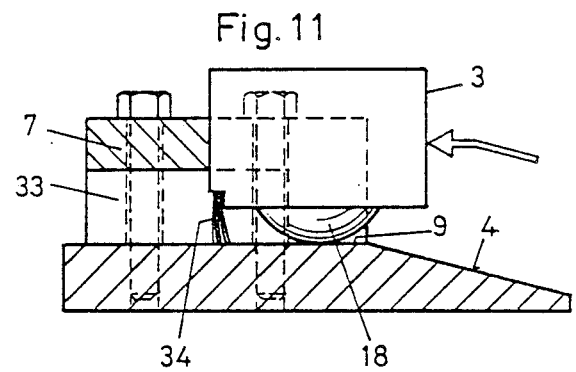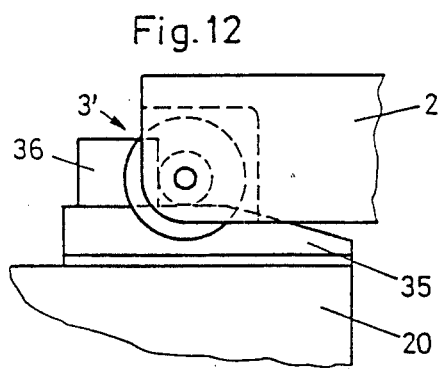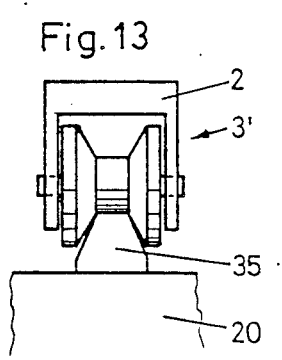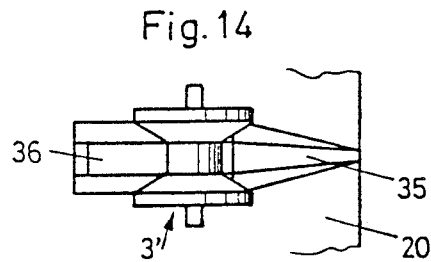

POSITIONING DEVICE FOR POSITIONING A LOAD CARRYING PLATFORM RELATIVE TO A DOCKING STATION

BACKGROUND OF THE INVENTION

The present invention relates to a positioning device for the accurate positioning of a load carrying platform of a conveyor vehicle relative to a fixed docking station. In automated production plants driverless conveyor vehicles are used to transport workpieces between the machining centers. For machining each workpiece has to be transferred from its conveyor vehicle to a machining center. Each workpiece therefore is fixed on a pallet, which at a docking station is moved from the vehicle to the machining center together with the workpiece fixed thereon. The pallet then is used to position the workpiece in the machining center, which obviously has to be done with high precision. Consequently, already the accuracy when transferring the pallet at the docking station has to be relatively high, i.e. in the range of ±0.5 mm. However, it is hardly possible to position driverless conveyor vehicles with an accuracy better than ±10 mm. This is not precise enough for said transfer of a pallet at a docking station. Furthermore, it is necessary to exactly level the pallet at the docking station before every transfer procedure.

DESCRIPTION OF THE PRIOR ART

Several positioning devices for the precise transferring of pallets at a docking station are known in the art. In the known devices, as e.g. described in the publications WO 86/03179, WO 86/02057 and German utility model publication no. 86 02 952.5, the necessary accuracy is achieved in that the conveyor vehicles have an adjustable platform for said pallet. This platform is in an elevated position when the conveyor vehicle arrives at a docking station. Then, in a first positioning step the platform is lowered onto positioning pins fixedly mounted to the docking station, whereby its lateral position is adusted. In a second step the platform then is levelled by partly lifting it again relative to the conveyor vehicle. Only when these two steps are terminated, the pallet can be transferred. Though this two steps-method allows accurate positioning, it is slow, which results in a relatively long idle time for both, the machining center and the conveyor vehicle.

On the other hand, it is also known to position a platform by laterally pushing it into positioning pins. Thereby, only one side of the platform is positioned, and the platform remains unleveled. Devices of this kind are disclosed in the Japanese publications no. 55-77655 and no. 57-201999. According to these publications the platforms cannot be levelled, which makes them unsuited for an accurate transfer of the above kind.

SUMMARY OF THE INVENTION

Therefore, it is an object of the invention to provide a positioning device, by which a load carrying platform of a conveyor vehicle can be accurately positioned relative to a fixed docking station in substantially less time.

It is a further object of the invention to provide a positioning device, by which the positioning procedure can be carried out in one single step resulting in a positioning of the platform along the three axes in space as well as in the horizontal plane.

It is still a further object of the invention to provide a positioning device, by which substantial inclination of the platform during the positioning procedure can be avoided. According to another object of the invention the levelling procedure should begin already before and carried out simultaneously with the positioning of the platform along the three axes in space, so that no additional time is used therefor.

Finally, it is an object of the invention to provide a positioning device, which does not comprise parts laterally projecting over the contour of the conveyor vehicle when it approaches the docking station, thereby avoiding the danger of collisions with projecting parts of the docking station.

These and still other objects and advantages of the invention will appear in the description and drawings.

BRIEF DESCRIPTION OF THE DRAWINGS

The invention will be described with reference to the accompanying drawings, in which:

FIG. 4 illustrates a second embodiment of the invention in plan view after the docking procedure;

FIG. 5 illustrates the embodiment of FIG. 4 in schematic front view exhibiting two phases of the docking procedure;

FIG. 7 illustrates the embodiment of FIG. 6 in side view;

FIG. 8 illustrates centering means at a docking station in plan view;

FIG. 9 illustrates stop means at a docking station in plan view;

FIG. 10 illustrates a second embodiment of centering means at a docking station in plan view;

FIG. 11 illustrates the centering means of FIG. 10 in side view;

FIG. 12 illustrates a third embodiment of centering means at a docking station in side view;

FIG. 13 illustrates the centering means of FIG. 12 in front view;

FIG. 14 illustrates the centering means of FIG. 12 in plan view;

DESCRIPTION OF THE PREFERRED EMBODIMENTS

Figure 1:
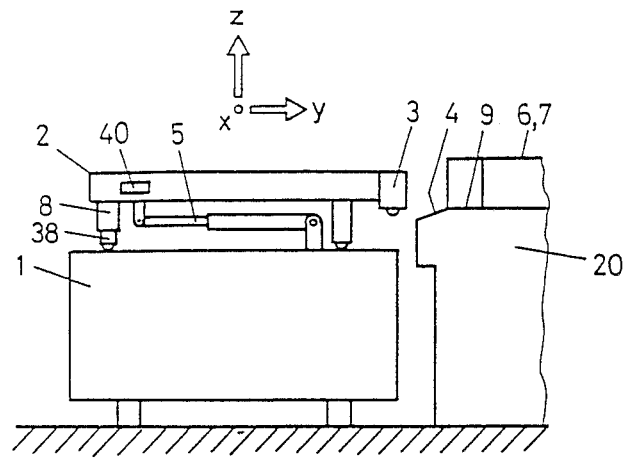
FIG. 1 illustrates a first embodiment of the invention in schematic front view before the docking procedure is started.
Figure 2:
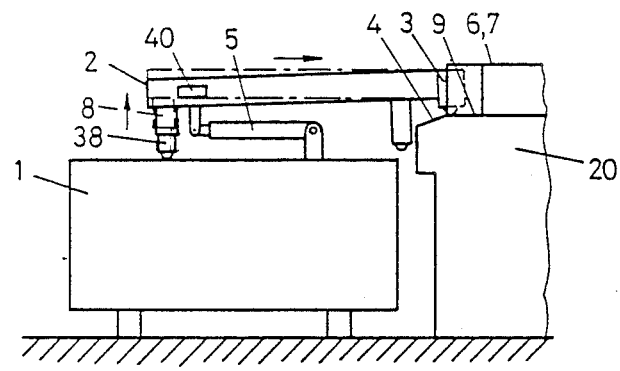
FIG. 2 illustrates the embodiment of FIG. 1 while the docking procedure is carried out.
Figure 3:
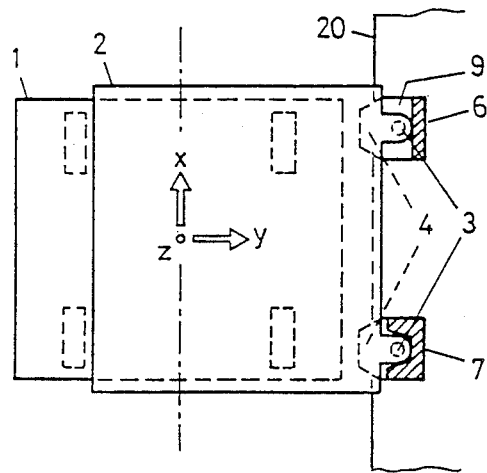
FIG. 3 illustrates the embodiment of FIG. 1 in plan view after the docking procedure has been completed.

Referring now, more particularly, to FIGS. 1 to 3, a conveyor vehicle is generally indicated by the numeral 1 and a fixed docking station by the numeral 20. The conveyor vehicle preferably is a driverless induction-wire guided vehicle as commonly known in automated warehouse conveyor systems. Since the structure of vehicles of this type is well known to the man skilled in the art, it will not be described herein in detail. In FIG. 3 the dash-dotted line along the x-axis can be understood as a guide wire located in the floor, along which the conveyor vehicle 1 is guided to a position adjacent to the docking station 20. The stopping position of the conveyor vehicle 1 in front of the docking station, however, is defined only within a range of ±10 mm along both the x- and y-axis.

The conveyor vehicle 1 comprises a load carrying platform 2, which is supported on a base portion 1 of the vehicle. When the conveyor vehicle 1 has arrived at a docking station 20, the platform 2 is laterally extended from its rest position, as shown in FIG. 1, towards the docking station 20 and is levelled into a horizontal position as shown in FIG. 2. This is done with a precision of less than 0.5 mm in each space-direction in order to transfer a pallet, which is supported on the platform 2, between the platform and the docking station. In FIGS. 1 to 3 the pallet to be transferred is not shown. However, such pallets are known to the man skilled in the art and therefore need not to be described in detail. Parts of a pallet 10 and of guiding and driving means 11, 12 for the pallet 10 on the platform 2 are shown in the FIGS. 6 and 7 and will be described in more detail later.

For laterally extending platform 2 towards the docking station 20 a hydraulic or pneumatic cylinder 5 is mounted between the base portion 1 of the vehicle and the platform 2. At its front end the platform 2 has two positioning elements 3 which cooperate with the docking station for positioning the platform 2 relative thereto. The docking station itself is provided with two sloped surfaces or inclines 4, on which the positioning elements 3 travel, when the platform is laterally moved towards the docking station, thereby lifting the front end of the platform 2 on a defined level 9. The platform 2 moreover is supported by legs 8 on the base portion 1 of the vehicles, which legs are provided with rolling balls 19 (see FIG. 6). At least the legs 8 located at the side of the platform 2 opposite to its front end comprise hydraulic Pistons 38, which are extensible to lift the platform 2 at its rear side, while the front side is lifted by the positioning elements 3 travelling on the inclines 4. The hydraulic pistons 38 are controlled by an electronic pendulum or another levelling instrument 40 located in the platform 2, which measures its inclination and controls the hydraulic pistons to level the platform. Measuring instruments of this type are commonly known to the man skilled in the art and therefore need not to be described in detail herein. Therefore, when the platform 2 is laterally moved into its extended position and thereby is lifted at its front end, it simultaneously is levelled by being lifted also at its rear end by means of the extensible supporting legs 8.

The lateral movement of the platform 2 by means of the cylinder 5 is continued until the positioning elements 3 of the platform 2 contact stop means 6 and centering means 7 provided behind the sloped surfaces 4 which are part of the docking station 20. The stop means 6 and the centering means 7 together define the position of the platform 2 with respect to the x-axis, to the y-axis and its angular position about the y-axis and the z-axis, as exhibited in FIGS. 1 to 3. By means of the extensible legs 8, which are controlled by the levelling instrument 40, the position of the platform relative to the z-axis and its angular position about the x-axis are defined, so that in the extended position of the platform 2 all six degrees of freedom are precisely defined.

For the mentioned positioning of the platform at the stop means 6 and at the centering means 7, the platform is slightly displaceable relative to the base porition 1 of the vehicle transverse to its axis of extension, as will be described later.

Figure 6:
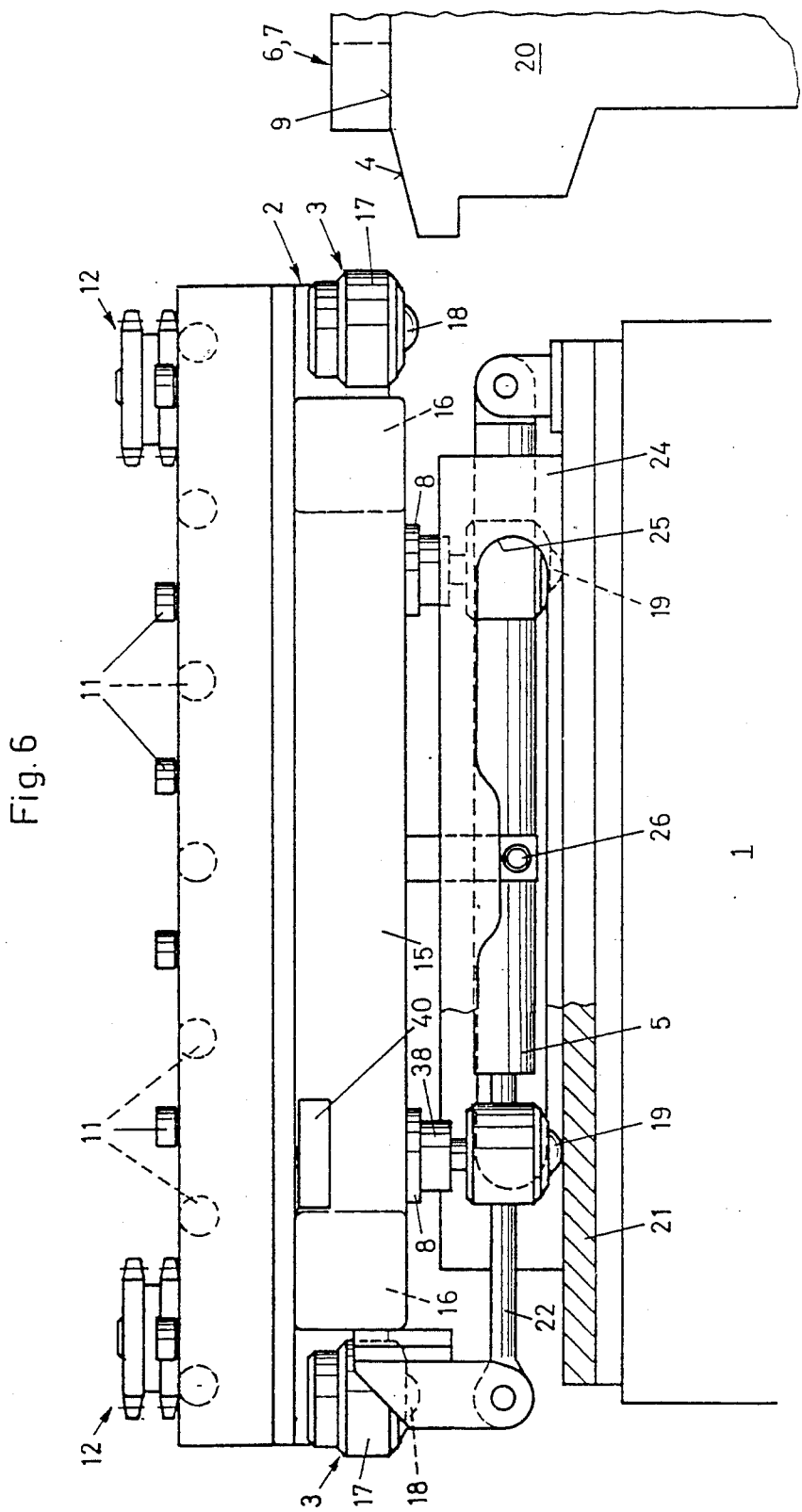
FIG. 6 illustrates a third embodiment of the invention in front view, whereas only the platform of the conveyor vehicle is shown.

In its extended and adjusted position the platform 2 is ready for the exchange of the pallet supported thereon. The pallet 10 then is moved by means of a driving unit 12 along guides 11 from the platform 2 to the docking station 20 or vice versa (FIGS. 6 and 7). When the pallet transfer is terminated, the platform 2 can be retracted into its rest position on the base portion 1 of the vehicle by means of the pneumatic cylinder 5 and is positioned on the base portion 1 by means of guiding members, as will be explained. The conveyor vehicle then is ready to leave the docking station.

As can be understood from the above general description, the transverse extension movement of the platform 2 and its positioning, especially its leveling, proceed simultaneously, so that when the platform 2 arrives in its extended position, it is completely adjusted relative to all six degrees of freedom. Moreover, the gap between the conveyor vehicle 1 and the docking station 20 is closed and the platform is approaching the docking station 20, thereby abbreviating the distance of travel between the platform 2 and a machining center located behind the docking station.

In FIGS. 6 and 7 the described embodiment of the invention is shown in more detail. Elements corresponding to already described parts are provided with the same numerals as in FIGS. 1 to 3.

FIG. 6 exhibits the platform 2 on the base portion 1 of the conveyor vehicle, seen in the travel direction of the vehicle. At the right side of the conveyor vehicle 1 a docking station 20 is shown. It has to be pointed out here that in this embodiment the platform 2 can be extended towards both sides. Therefore, the docking station could as well be on the left side of the conveyor vehicle 1. In FIG. 7 a view transverse to the travel direction i.e. in the axis of extension of the platform 2 is given. As can be seen from these two figures, the platform has a rectangular frame 15, 16 of hollow profiles, at each corner of which frame a positioning element 3 is arranged. Each positioning element 3 comprises a cylindrical housing 17, within which a ball 18 is rotatably held. The balls 18 of those positioning elements 3 which are located at the front end of the platform engage the sloped surfaces 4 of the docking station 20 when the platform 2 is moved for a certain distance towards the docking station. The front end of the platform then is supported and lifted by these sloped surfaces 4, while the balls 18 travel thereon. The supporting legs 8 at the front side of the platform 2 consequently are lifted off the base portion 1 of the conveyor vehicle. As soon as the positioning elements 3 arrive at the stop and centering means 6, 7, their cylindrical housings 17 act as positioning members, as can best be seen from FIGS. 8 and 9.

In its rest position the platform 2 is supported on the base portion 1 of the conveyor vehicle by means of the four supporting legs 8. At their lower ends the supporting legs 8 are provided with rotatable balls 19, by which the platform travels on a supporting surface 21 of the base portion 1 of the vehicle.

The supporting legs 8 are part of the leveling device. There are always the two legs 8 located at the rear side of the extended platform 2, which are operative to lift the platform at this rear side for leveling it during the docking procedure, as already described above. Into each leg 8 a hydraulic Piston 38 is integrated, by which the length of each leg is extensible. The two legs 8 located on the front side and the rear side of the platform, respectively, are hydraulically interconnected, so that they adapt their relative positions in accordance with the level 9 defined by the docking station.

The lateral extension movement of the platform 2 on the supporting surface 21 is driven by a hydraulic cylinder 5, which is hingedly connected to the base portion 1 of the conveyor vehicle. A driving rod 22 of said cylinder 5 is hingedly connected with the frame 16 of the platform (FIG. 6).

While the platform is extended, the four support legs 8 first roll on the supporting surface 21. When the positioning elements 3 engage the sloped surface 4 of the docking station, the two front legs 8 are lifted off the supporting surface 21, whereas the two rear legs 8 remain engaged with the supporting surface and begin to extend for leveling the platform. Also in its rest position the position of the platform 2 relative to the base portion 1 of the conveyor vehicle should not exceed a certain range of tolerance. Therefore, guiding ledges 23 are provided at the supporting surface 21 of the conveyor vehicle. These ledges 23 can only be seen in FIG. 7, whereas in FIG. 6 they have been omitted for reasons of clearness. The guiding ledges 23 are arranged along the extending direction of platform 2 and are resiliently mounted transversely to this direction by spring means 27. The spring means 27 are arranged to press only against the platform 2, unless it is centered. Else the platform 2 is not engaged by the springs 27 or ledges 23. By the ledges 23 the platform is guided during its lateral extension movement until its positioning elements 3 engage the stop and centering means 6, 7 of the docking station 20. The ledges 23 thereby provide for a precentering of the platform, because they provide for an exact positioning of the platform 2 relative to the conveyor vehicle, when the docking procedure is started. Thereby, it is ascertained that the only tolerances to be adjusted during the docking procedure are those of the position of the vehicle itself and that there is no accumulation of tolerances.

Holding rails 24 are arranged parallel to the mentioned ledges 23 for securing the platform 2 on the vehicle during travel. The holding rails 24 are provided with guiding slits 25, into which mandrels 26 mounted to the platform 2 project. As can be seen from FIG. 6, the slits 25 are shaped to hold the platform 2 down in its rest position, but to release it for the transverse extension movement.

In FIG. 7 parts of a pallet 10 can be seen together with a driving mechanism 12 and guiding rollers 11 for the pallet at the upper side of platform 2. The driving mechanism 12 of the present embodiment is a chain driver, which is a well-known technique to the man skilled in the art, and therefore needs not to be described here. The chain driver 12 has a chain for engaging the pallet 10 at its bottom side and for displacing it along the guiding rollers 11. When platform 2 is in its extended and adjusted position, the chain driver 12 becomes operative to displace the pallet 10 towards the docking station 20. At the docking station the pallet 10 then will be taken over by a corresponding driving and guiding mechanism of the docking station (not shown). As exhibited in FIG. 7, the guiding rollers 11 can be laterally displaced to be adapted to pallet types of different size. In the left half of FIG. 7 a relatively small pallet 10 is shown, whereas the guiding rollers 11 in the right half of FIG. 7 are adjusted for receiving a larger pallet.

The docking procedure with embodiment of FIGS. 6 and 7 is substantially the same as already described in connection with FIGS. 1 to 3, but the platform can be laterally extended selectively to the right and to the left side relative to the travel direction of the conveyor vehicle. Therefore, the docking stations 20 can be arranged on either side of the path of the vehicle. For positioning of the platform 2 at a docking station 20 the positioning elements 3 contact with their cylindrical outer surfaces 17 the stop means 6 and the centering means 7, respectively, at the docking station, as can be seen from FIGS. 8 and 9. The centering means 7 comprise a conical opening for receiving and centering one of the positioning elements 3, whereas for the other positioning element 3 merely a straight stop 6 is provided. By these stop and centering means 6, 7, the linear position of the platform 2 along the x- and y-axis, as well as the angular position about the z-axis is adjusted, as already explained.

In FIGS. 10 and 11 another embodiment of the mentioned centering and stop means is disclosed, which are especially suited to be used in the neighborhood of machining centers. In such case there is a certain danger that waste of the machining process collects on the centering and stop means which would severely affect the accuracy of the positioning. To avoid this, the centering conus of the centering means 7 has a rear opening 33, through which waste is pushed away by the positioning element 3. As can be seen from FIG. 11, the positioning element 3 additionally can be provided with a brush 34 for brushing possible waste off the sloped and horizontal surfaces 4 and 9 of the centering means 7.

Still another embodiment of the stop and centering means 6, 7 is shown in the FIGS. 12 to 14 in different views. The positioning elements at platform 2 are formed as rail wheels 3' and the centering means at the docking station are conically and prismatically shaped rails 35 forming a sloped surface as well as a level for the rail wheels 3'. Opposite to the sloped part of the rails 35 a stop 36 is provided. This embodiment is especially advantageous because the stop and centering means 6, 7 do not form large horizontal surfaces, on which waste is deposited. Furthermore, the centering transverse to the axis of extension (y-axis) is started relatively early in the docking procedure, i.e. as soon as the wheels 3' contact the rails 35. For the rest, the docking procedure is exactly the same as already described.

In all embodiments described thus far in this specification, a complete docking procedure has to be carried out at each docking station. To avoid this it is possible in a further embodiment of the invention to displace a conveyor vehicle along a path between several docking stations without repeating the whole docking procedure at each station. Along said path the platform 2 is guided by means of a rail arranged along thereof, so that the positioning of the platform 2 can partly be maintained during any displacement along this path though the conveyor vehicle travels along its own induction guided and therefore relatively inaccurate path.

Referring now to the FIGS. 4 and 5, a first version of an embodiment of this type is described. The platform 2 is provided with two positioning elements 3 which in addition to the embodiment described before each comprises a guiding wheel 30 having an axis of rotation parallel to the axis of extension of the platform 2. In the extended position of the platform 2 the two guiding wheels 30 are lowered onto a guiding rail 31 when the platform 2 is leveled by means of the hydraulic legs 8 (FIG. 5). They thereby define the exact height of the front end of the platform 2 as well as its exact position relative to the axis of extension of the platform 2 (y-axis). The platform 2 then forms a rail guided carriage which can be displaced by the conveyor vehicle 1 between the docking stations and which always remains leveled and positioned along the y-axis. When the conveyor vehicle stops at a docking station, the position of the platform 2 has only to be adjusted along the x-axis, i.e. along the travel direction of the conveyor vehicle. To this end platform 2 is provided with an extensible and retractable conus member 32, which at each docking station is urged against a corresponding fixed centering member (not shown) to precisely adjust the position of platform 2 along said x-axis. Obviously, the docking procedure at each station needs less time since only one degree of freedom has to be adjusted before transferring a pallet. For leaving the guiding rail 31, the guiding wheels 30 are lifted from the rail and the platform 2 is retracted into its rest position on the base portion 1 of the conveyor vehicle as already described before.

Figure 15:
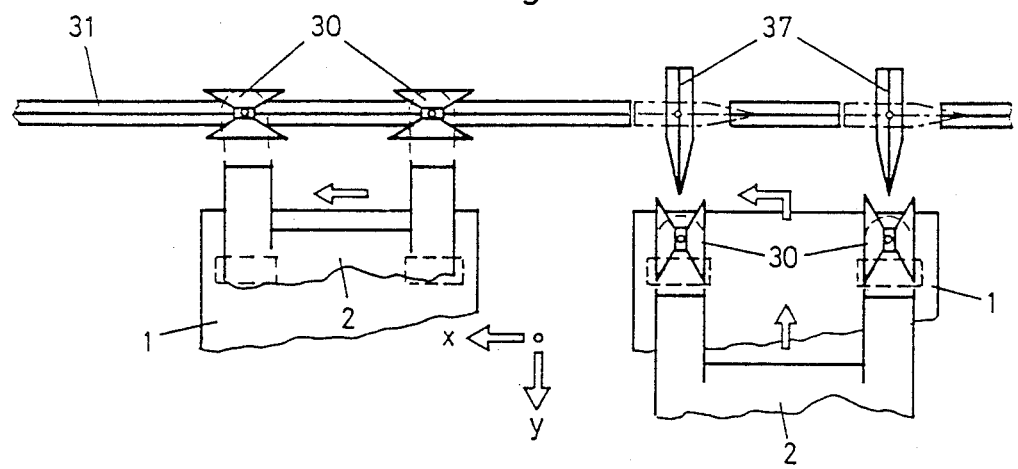
FIG. 15 illustrates a further embodiment of the invention in schematic plan view with a docking station having a guiding rail.
Figure 16:
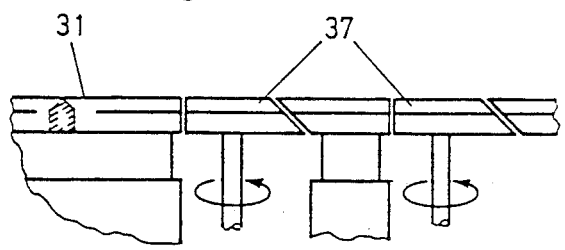
FIG. 16 illustrates the guiding rail of the embodiment of FIG. 15 in side view.

Finally, with reference to FIGS. 15 and 16, a second version of such a rail guided embodiment of the invention is described. In FIG. 15 a guiding rail 31 can be seen in plan view, which is arranged between several docking stations as already described. Furthermore, FIG. 15 shows parts of a platform 2 before docking (above) and during a linear displacement along the rail 31 (below), whereas the conveyor vehicle 1 itself is schematically shown in dotted lines.

In order to couple the platform 2 with the guiding rail 31 and for simultaneously leveling it in height, the guiding rail 31 comprises swivelling rail portions 37, which can be moved from a position flushing with the rail 31 into a receiving position for the platform, as shown in FIG. 15. In the receiving position the guiding wheels 30 of platform 2 engage the sloped conical ends of the rail portions 37, when the platform 2 is laterally extended as described before. As soon as the lateral extension of the platform 2 is completed, the rail portions 37 are turned into their flushing position, as especially can be seen from FIG. 16 showing rail 31 in a side view. The platform 2 then is positioned along its axis of extension (y-axis) and leveled in height. The positioning in the direction of the rail 31 is carried out as already described with reference to FIG. 4. This embodiment of the invention is especially suited for plants, in which the machining centers are arranged along straight lines.

In all described embodiments the docking procedure needs substantially less time than in the prior art devices since no separate leveling step is necessary after positioning. Moreover, any steep inclination of the platform is avoided throughout the whole conveying and docking cycle. Since the platform 2 is laterally extended only after the conveyor vehicle has arrived at the docking place, there are no laterally projecting parts at the conveyor vehicle as this is the case in the prior art. During conveying the load carrying platform 2 always remains in its lowered position, so that the center of gravity of the conveyor vehicle is relatively low during travel.

While there are shown and described present preferred embodiments of the invention, it is to be distinctly understood that the invention is not limited thereto, but may be otherwise variously embodied and practiced within the scope of the following claims.

We claim:

1. Positioning device for the accurate positioning of a load carrying platform of a conveyor vehicle relative to a fixed docking station, comprising a conveyor vehicle with a base portion and a load carrying platform displaceably supported on said base portion and movable relative thereto along a substantially horizontal axis of extension from a rest position into at least one extended position, said load carrying platform having at least one front end with first positioning means, lifting means located near an end opposite to said at least one front end and a levelling device for controlling said lifting means, and further comprising a fixed docking station, said docking station comprising second positioning means, which second positioning means have incline means ending on a defined level, whereby, while said conveyor vehicle is positioned adjacent to said docking station said platform is moved from said rest position into said extended position, said first positioning means will cooperate with said incline means to raise said front end of said platform to said defined level, and whereby said lifting means simultaneously are operative to lift said end opposite to said front end in order to adjust said platform to a levelled position during its movement from said rest position to said extended position.

2. Positioning device of claim 1, wherein said conveyor vehicle has a longitudinal axis and said load carrying platform has an axis of extension extending in transverse direction to said longitudinal axis and being movable into two extended positions located on opposite sides of said longitudinal axis, said platform having two opposite front ends, each of which belonging to one of said extended positions, and having two lifting means, each being located near an end opposite of the respective front end and being operative only together with the respective front end.

3. Positioning device of claim 1, wherein said second positioning means at said fixed docking station comprises at least one horizontal surface at said defined level for supporting said first positioning means of said load carrying platform in its extended position.

4. Positioning device of claim 1, wherein said second positioning means at said docking station comprises at least one stop member operative together with said first positioning means for defining the position of said platform along its axis of extension relative to said docking station when said platform is in its extended position.

5. Positioning device of claim 1, wherein said second positioning means at said docking station comprises a centering member operative together with said first positioning means for defining the position of said platform in a direction transverse to said axis of extension relative to said docking station when said platform is in its extended position 6. Positioning device of the claims 2 to 4, wherein said incline means of said second positioning means is displaced relative to said stop and centering member, so that said platform on its path from said rest position to said extended position is raised at its front end by said incline means and lifted at its rear end by said lifting means already before it is positioned along and transverse to its axis of extension.

7. Positioning device of claim 1, wherein said platform comprises a sensor for measuring its inclination, preferably an electronic pendulum sensor, operatively connected to said lifting means for controlling the same to adjust said platform in a levelled position while it is moved from its rest position to its extended position.

8. Positioning device of claim 1, wherein said first positioning means at the front end of said platform comprise rolling means for rolling on said incline means, while said platform is moved from its rest position to its extended position and for supporting said front end of said platform.

9. Positioning device of claim 1, wherein said first positioning means at the front end of said platform means at said second positioning means comprise guiding rails cooperating with said guiding rollers.

10. Positioning device of claim 1, wherein said first positioning means at the front end of said platform is provided with swivelling rollers, and wherein said second positioning means comprise longitudinal guiding rails which at said docking station comprise swivelling rail portions turnable into a platform receiving position transversely to the guiding rail and thereby forming said incline means, said swivelling rollers of said platform in its extended position being turnable together with said rail portions into the direction of the longitudinal guide rails, thereby defining the position of the platform in said axis of extension and allowing a transverse displacement of said platform along said guiding rails

* * * * *

UNITED STATES PATENT AND TRADEMARK OFFICE
CERTIFICATE OF CORRECTION

PATENT NO.   : 4,940,378
DATED        : July 10, 1990
INVENTOR(S)  : Hans-Ueli Feldmann and Ueli Heiz It is certified that error appears in the above-identified patent and that said Letters Patent is hereby corrected as shown below:

Col. 3 line 41, "Pistons" should be -- pistons --;

Col. 5 line 2, "Piston" should be -- piston --;

Col. 9 line 12, after "platform" insert -- comprise guiding rollers, and wherein said incline --;

Col. 10 line 13, after "rails" insert -- . --.

Signed and Sealed this

Ninth Day of July, 1991

Attest:

HARRY F. MANBECK, JR.

Attesting Officer

Commissioner of Patents and Trademarks